US00RE36739E

United States Patent [19]

Gutierrez

[11] E Patent Number: Re. 36,739

[45] Reissued Date of Patent: Jun. 20, 2000

[54] METHOD OF PLAYING A CARD GAME FOR A CASINO

[76] Inventor: Teofilo Gutierrez, 7041 Bailey Cir., Las Vegas, Nev. 89117

[21] Appl. No.: 09/272,657

[22] Filed: Mar. 18, 1999

Related U.S. Patent Documents

Reissue of:

[64] Patent No.: 5,692,755
Issued: Dec. 2, 1997
Appl. No.: 08/739,925
Filed: Oct. 30, 1996

U.S. Applications:

[63] Continuation-in-part of application No. 08/592,765, Jan. 26, 1996, abandoned.

[51] Int. Cl.[7] ..... A63F 1/00

[52] U.S. Cl. ..... 273/292; 273/306

[58] Field of Search ..... 273/292, 274, 273/306, 309; 463/12, 13

[56] References Cited

U.S. PATENT DOCUMENTS 5,257,810 11/1993 Schorr et al. ..... 273/292
5,390,934 2/1995 Grassa ..... 273/292
5,397,128 3/1995 Hesse et al. ..... 273/292

OTHER PUBLICATIONS

*Scarne's Encyclopedia of Games*, J. Scarnes, "Monte" pp. 310–311, 1973.

*Primary Examiner*—Benjamin H. Layno
*Attorney, Agent, or Firm*—Robert Ryan Morishita; Quirk & Tratos

[57] ABSTRACT

A card game is played on a felt covered semicircular table top with player stations along its arcuate edge. Pairs of cards of a deck are dealt face up until a pair consists of two cards of unequal rank. The two cards are respectively designated a B card and a P card. Cards of the deck are thereafter dealt face up until a conclusion card is dealt that is equal in rank to either the B card or the P card. A player makes a color wager on the color of a card that is dealt face up, a HI/LO wager on the rank of the card that is dealt face up and a P/B wager on the rank of the conclusion card.

8 Claims, 2 Drawing Sheets

METHOD OF PLAYING A CARD GAME FOR A CASINO

Matter enclosed in heavy brackets [ ] appears in the original patent but forms no part of this reissue specification; matter printed in italics indicates the additions made by reissue.

This application is a *reissue of application Ser. No. 08/739,925, now U.S. Pat. No. 5,692,755 which is a* continuation-in-part of application no. 08/592,765, filed Jan. 26, 1996, now abandoned.

BACKGROUND OF THE INVENTION

1. Field of Invention

This invention is in the field of games of chance and, more particularly, is a method and apparatus for playing a new type of card game suitable for a casino environment.

2. Description of the Prior Art

A card game in a casino is usually played on a green felt covered table top that is semicircular. Accordingly, the table top has an arcuate edge and a straight edge. The covering typically carries indicia where cards are placed. A plurality of player stations are evenly spaced adjacent to the arcuate edge.

A check rack is located on the table top near the straight edge about midway between the ends thereof. The casino's gaming tokens, known as checks (often referred to as chips), are stored in the check rack. The covering often carries indicia where checks are placed during play of the game.

A dealer is usually positioned near the check rack. Because the player stations are along the arcuate edge, all of the player stations are equidistant from the dealer.

Blackjack, for example, is a game that is typically played on the felt covered table top. After World War II, gaming patrons deserted games such as Roulette and 3-Dice Hazard in favor of Blackjack because they won more often. In other words, the gaming patrons compared risks involved in each of the games and gravitated to the game with the lowest risk.

Playing a round of Blackjack is time consuming because cards are dealt to all players at the table. Additionally, the dealing of the cards to all of the players causes a security problem. Heretofore, there has not been a card game suitable for a casino environment where none of the players are dealt cards and the risks approximate those encountered in Blackjack.

SUMMARY OF THE INVENTION

An object of the present invention is a card game suitable for play in a casino environment where none of the players are dealt cards[:].

Another object of the present invention is a card game suitable for play in a casino environment where a player is not exposed to risks significantly beyond those encountered in Blackjack.

According to a first aspect of the present invention, a card game is played on a table that has a semicircular fabric covered top with a central portion that carries a P card indicium and a B card indicium. A plurality of evenly spaced similar groups of wagering indicia are carried on the covering adjacent to an arcuate edge of the table top.

According to a second aspect of the present invention, the game is played with a card deck that includes a standard deck of cards and a joker. The heart and diamond suits of the card deck are collectively identified as being the color, red, and the spade and club suits of the deck are collectively identified as being the color, black. Cards that bear nominal identifications two through ten, jack, queen, king and ace have rankings that differ from each other. Two cards of unequal rank are disposed face up and designated P and B, respectively. Cards from the deck are dealt face up until a conclusion card is dealt that has the same rank as either the P card or the B card. A player makes a color wager on the color of a card that is dealt face up, a HI/LO wager on the rank of the card that is dealt face up and a P/B wager in the rank of the conclusion card.

A game in accordance with the invention is easy to play, does not expose a player to risks significantly beyond those encountered in Blackjack, is not as time consuming as Blackjack and obviates the security problems of Blackjack.

Other objects, features and advantages of the present invention should be apparent from the following description of a preferred embodiment thereof as illustrated in the accompanying drawing.

DESCRIPTION OF THE PREFERRED EMBODIMENT

Figure 1:
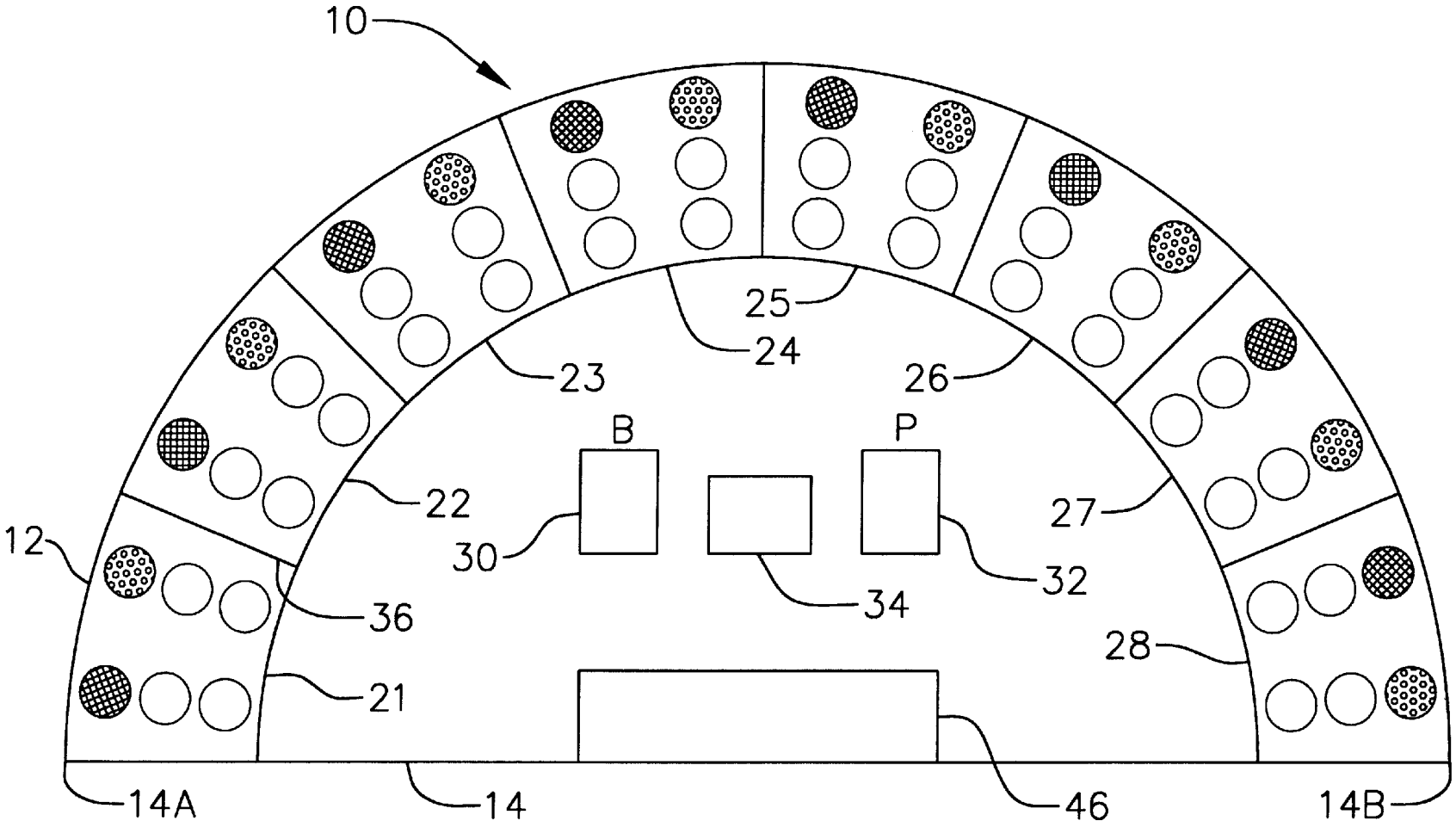
FIG. 1 is a plan view of a table top in accordance with a first aspect of the present invention.

As shown in FIG. 1, a table has a semicircular fabric covered table top 10 with an arcuate edge 12 and a straight edge 14. A check rack 16 is mounted upon the table top 10 near the edge 14 substantially midway between ends 14A, 14B thereof. A dealer (not shown) is positioned near the check rack 16.

The covering carries eight evenly spaced similar groups of wagering indicium 21–28 adjacent to the edge 12. Preferably, the fabric of the covering is green felt.

The groups 21–28 respectively comprise eight player stations. The eight player stations are consecutively numbered one through eight, respectively, with station one being adjacent to the end 14A.

Each player is positioned near a player station. Since there are eight player stations, there is at least one but no more than eight players in the game. In an alternative embodiment, there may be other than eight player stations.

A rectangular B card indicium 30, and a rectangular P card indicium 32 are carried on a central portion of the covering. The indicia 30, 32 are of similar size and orientation. Lettering of the letters B and P are carried adjacent to the indicia 30, 32, respectively. A rectangular turned card indicium 34 is carried intermediate to the indicia 30, 32.

Figure 2:
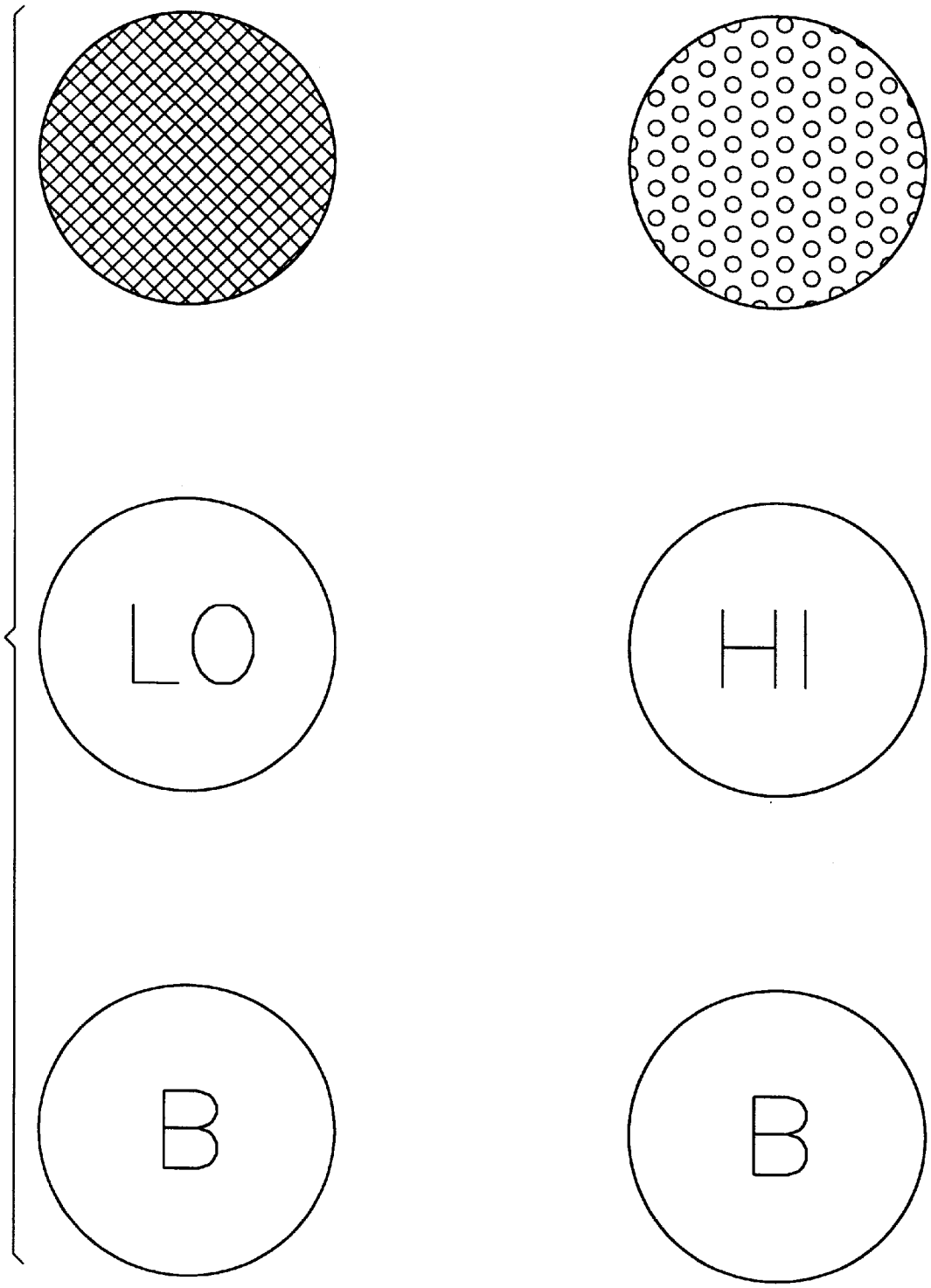
FIG. 2 is an enlarged plan view of a group of wagering indicia on the table top of FIG. 1.

As shown in FIG. 2, the group 21 includes disc shaped indicia BL, R that are slightly larger in diameter than the diameter of a check. The indicium [B] *BL* is disposed adjacent to the corner 14A (FIG. 1). The indicium R is disposed adjacent to a junction of the edge 12 and a group separation line 36. In this embodiment, the indicia BL, R (FIG. 2) are colored black and red, respectively.

The group 21 additionally includes circular indicia LO, B that have substantially the same diameter as the diameter of the indicia BL, R. The indicia BL, LO, B are disposed along a line that is perpendicular to the edge 12 with the indicium LO intermediate to the indicia BL, B. Lettering of the characters, LO, B, are carried within the indicia LO, B, respectively.

The group 21 further includes circular indicia HI, P that are similar to the indicia LO, B, respectively. The indicia R. [P, LO] *HI, P* are disposed along a line that is perpendicular to the edge 12 with the indicium HI disposed intermediate to the indicia R, P. Lettering of the characters, HI, P, are carried within the indicia HI, P, respectively.

In a game described hereinafter, the heart and diamond suits of a standard deck of cards are collectively identified as being the color, red. The spade and club suits of the deck are collectively identified as being the color, black. Additionally, cards that bear nominal identifications two through ten, jack, queen, king and ace have rankings that differ from each other. The cards that bear the identification ace, two, three, four, five, and six are referred to as low ranking cards. The cards that bear the identifications eight, nine, ten, jack, queen, king are referred to as high ranking cards.

In this embodiment, the game is played with one standard deck of cards and a joker. In an alternative embodiment, the game is played with engith decks of cards and eight jokers.

A round of play of the game starts by the players each making three wagers. At station one, for example, a color wager is made by placing one or more checks within either the indicium BL or the indicium R. A B/P wager is make by placing one or more checks within either the indicium B or the indicium P. A HI/LO wager is made by placing one or more checks within either the indicium HI or the indicium LO. The dealer successively deals pairs of cards face up until a pair consists of two cards of unequal rank. A first of the two cards is designated as a [B] *P* card and is placed face [up] *down* within the indicium [30] *32*. A second of the two cards is designated as a [P] *B* card and is placed face [up] *down* within the indicium [32] *30*. The B and P cards remain face [up] *down* within the indicia 30, 32, respectively.

After the B and P cards are designated, a third card is dealt face [up] *down* and placed within the indicium 34 [thereby placing it in plain view] *then exposed* while wagers are resolved. When the third card is the joker, the players lose all wagers, whereby all wagers in connection with the third card are resolved. Additionally, the round of play ends.

When the third card is a seven, the players lose the color wager and the HI/LO wager. However, the round of play does not end.

When the third card is neither a seven [or] *nor* the joker, and is red, the player at station one, for example, wins the color wager when checks had been placed within the R indicium (FIG. 2). Correspondingly, when the third card is black, the station one player wins the color wager when checks had been placed within the BL indicium.

Similarly, the station one player wins the HI/LO wager when checks had been placed within the indicium corresponding to the rank of the third card. When, for example, checks are placed within the HI indicium, the station one player only wins the HI/LO wager only when the third card is a high ranking card. When checks are placed within the LO indicium, the station one player only wins the HI/LO wager when the third card is a low ranking card.

When the rank of the third card does not equal the rank of either the P card or the B card, the players may again make the color and HI/LO wagers on a fourth card that is dealt face up and placed within the indicium 34 over the third card. When the fourth card, or any successively dealt card, is either a seven or the joker, the players lose the color and HI/LO wagers. The color and HI/LO wagers may be made on a successively dealt card.

When the rank of the third card, or any successively dealt card equals the rank of either the P card of the B card, it is a conclusion card that ends the round of play. When checks are placed by the station one player in the B indicium, the B/P wager is won when the conclusion card has a rank equal to the rank of the B card. Correspondingly, when checks are placed within the P indicium, the B/P wager is won when the conclusion card has a rank equal to the rank of the P card. *It should be understood that players at stations two through eight make wagers similar to those described in connection with the station one player.*

While the invention has been particularly shown and described with reference to a preferred embodiment thereof, it should be understood by those skilled in the art that changes in form and detail may be made therein without departing from the spirit and scope of the invention.

I claim:

1. In the method of playing a card game, suitable for a casino environment, with a standard deck of cards and a joker with cards that bear nominal identifications two through ten, jack, queen, king and ace having rankings that differ from each other, the cards also bear color identification wherein each card is identified by one of two colors, the steps of:

successively dealing pairs of cards of the deck face up until a pair consists of two cards of unequal rank;

designating a first and a second of said two cards as a [B] *P* card and a [P] *B* card, respectively;

successively dealing cards face up until a conclusion card is dealt that has the same rank as either the P card or the B card; and having a player make a color wager by choosing which of the colors a card dealt after the P card and B card will have, the color wager being won when the color of the card corresponds to said choice, having a player make a HI/LO wager by choosing whether the rank of a card, dealt after the P card and B card, will be of a high ranking greater than a predetermined rank or whether the rank of the card will be of a low ranking less than the predetermined rank, the HI/LO wager being won when the rank of the card corresponds to said choice, and having a player make and a P/B wager by choosing whether the rank of the conclusion card will be equal to the P card or the B card, the P/B wager being won when the rank of the conclusion card corresponds to said choice.

2. In the method of claim 1 wherein said player loses all wagers when a first dealt card is the joker.

3. In the method of claim 2 wherein said player loses said color and HI/LO wagers when a card dealt after said first dealt card is the joker.

4. In the method of claim 1 wherein said player has an option of making a hedge wager that a card to be dealt is the joker.

5. In the method of claim 1 wherein said player loses said color and HI/LO wagers when a dealt card is a specified card.

6. In the method of claim 5 wherein said player has an option of making a hedge wager that a card to be dealt is said specified card.

7. In the method of claim 1 wherein cards that bear the identifications ace, two, three, four five and six are referred to as low ranking cards and cards that bear the identification eight, nine, ten, jack queen and king are referred to as high ranking cards, said HI/LO wager being made by said player making a choice of either a high rank or a low rank, said HI/LO wager being won when the rank of a next turned card corresponds to said choice.

8. In the method of claim 1 where the hearts and diamond suits of the deck are collectively identified as being the color, red and the spade and club suits of the deck are collectively identified as being the color, black, said color wager being made by said player making either a choice of the color, red or a choice of the color, black, said color wager being won when the color of a next turned card corresponds to said choice.

* * * * *

UNITED STATES PATENT AND TRADEMARK OFFICE
CERTIFICATE OF CORRECTION

PATENT NO : Re.36,739

DATED : 6/20/00

INVENTOR(S) : Teofilo Gutierrez

It is certified that error appears in the above-identified patent and that said Letters Patent are hereby corrected as shown below:

In the Drawings:

Sheet 2 of 2 of the drawings, Figure 2, the letter in the circle at the bottom right-hand corner of the drawing should be "P" instead of -- B --.

Column 3, line 2 delete "R." insert --R,--.

Column 3, line 19 delete "engith" insert --eight--.

Column 3, line 68 delete "of" (second occurrence) and insert --or--.

Column 4, line 41, delete "and".

Column 4, line 61, insert a comma after "four".

Column 4, line 63, insert a comma after "jack".

Signed and Sealed this

Tenth Day of April, 2001

*Attest:*

Nicholas P. Godici

NICHOLAS P. GODICI

*Attesting Officer*

*Acting Director of the United States Patent and Trademark Office*